(12) United States Patent
Dubreuil et al.

(10) Patent No.: US 9,316,159 B2
(45) Date of Patent: Apr. 19, 2016

(54) GAS TURBINE ENGINE WITH TRANSMISSION

(71) Applicant: Pratt & Whitney Canada Corp., Longueuil (CA)

(72) Inventors: Jean Dubreuil, Boucherville (CA); Stephen Kenny, Caledon Village (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 580 days.

(21) Appl. No.: 13/754,045

(22) Filed: Jan. 30, 2013

(65) Prior Publication Data

US 2014/0208760 A1    Jul. 31, 2014

(51) Int. Cl.
*F02K 3/00* (2006.01)
*F02C 7/36* (2006.01)

(52) U.S. Cl.
CPC ............................. *F02C 7/36* (2013.01)

(58) Field of Classification Search
CPC .................................. F02C 7/36; F02C 3/307
USPC ..................... 60/226.1, 268, 39.163; 475/288
See application file for complete search history.

(56) References Cited

U.S. PATENT DOCUMENTS

| | | | |
|---|---|---|---|
| 3,368,347 A * | 2/1968 | Wickman | 60/791 |
| 3,585,795 A | 6/1971 | Grieb | |
| 3,710,576 A * | 1/1973 | Evans et al. | 60/773 |
| 4,018,045 A | 4/1977 | Greune et al. | |
| 4,195,473 A | 4/1980 | Aspinwall | |
| 4,412,460 A | 11/1983 | Barthelemy | |
| 4,858,428 A | 8/1989 | Paul | |
| 5,011,464 A | 4/1991 | White | |
| 5,328,419 A | 7/1994 | Motl et al. | |
| 5,345,760 A * | 9/1994 | Giffin, III | 60/226.1 |
| 5,694,567 A | 12/1997 | Bourekas et al. | |
| 5,782,433 A | 7/1998 | Goi et al. | |
| 6,042,499 A | 3/2000 | Goi et al. | |
| 6,053,452 A | 4/2000 | Yamakawa et al. | |
| 6,254,504 B1 | 7/2001 | Goi et al. | |
| 6,302,356 B1 | 10/2001 | Hawkins | |
| 6,524,068 B2 | 2/2003 | Carter, Jr. | |
| 6,607,357 B2 | 8/2003 | Caramaschi | |
| 6,695,254 B2 | 2/2004 | Zoppitelli et al. | |
| 6,895,741 B2 | 5/2005 | Rago | |
| 7,044,877 B2 | 5/2006 | Ai | |
| 7,296,767 B2 | 11/2007 | Palcic et al. | |
| 7,396,209 B2 | 7/2008 | Miller et al. | |
| 7,628,355 B2 | 12/2009 | Palcic et al. | |
| 7,690,185 B2 | 4/2010 | Linet et al. | |
| 7,698,884 B2 | 4/2010 | Maguire et al. | |
| 7,707,909 B2 | 5/2010 | Linet et al. | |
| 7,758,302 B2 | 7/2010 | Linet et al. | |
| 7,942,079 B2 * | 5/2011 | Russ | 74/664 |
| 7,942,365 B2 | 5/2011 | Palcic et al. | |
| 8,561,383 B2 * | 10/2013 | Suciu et al. | 60/39.163 |
| 2004/0266580 A1 * | 12/2004 | Stevenson | 475/282 |
| 2006/0010875 A1 | 1/2006 | Mahoney et al. | |
| 2008/0098712 A1 * | 5/2008 | Sheridan | 60/226.1 |
| 2009/0320491 A1 * | 12/2009 | Copeland | 60/772 |
| 2010/0093476 A1 | 4/2010 | Carter et al. | |
| 2013/0199156 A1 * | 8/2013 | Ress et al. | 60/224 |

* cited by examiner

*Primary Examiner* — Charles Freay
(74) *Attorney, Agent, or Firm* — Norton Rose Fulbright Canada

(57) ABSTRACT

A gas turbine engine with a transmission having a first rotatable member coupled to an engine spool, a second rotatable member coupled to a compressor rotor, and coupled rotatable members defining at least first and second alternate transmission paths between the first and second members. Each transmission path defines a different fixed transmission ratio of a rotational speed of the second member on a rotational speed of the first member.

17 Claims, 4 Drawing Sheets

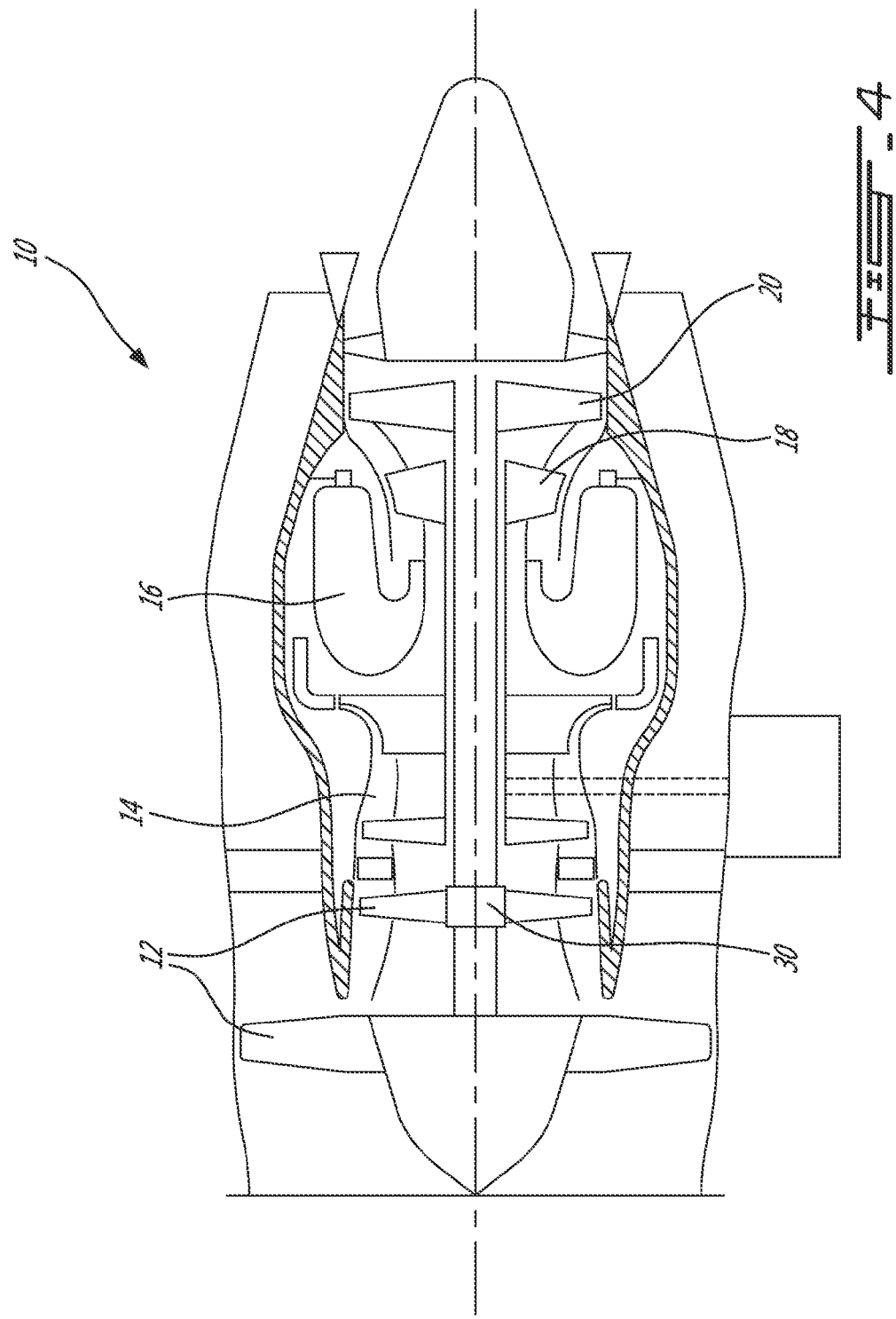

GAS TURBINE ENGINE WITH TRANSMISSION

TECHNICAL FIELD

The application relates generally to gas turbine engines and, more particularly, to a gas turbine engine having a transmission.

BACKGROUND OF THE ART

In a turbofan engine, rotor(s) of the low pressure turbine driven by the exhaust flow of the core section are generally drivingly connected to rotor(s) of a low pressure compressor, including the fan, through the low pressure shaft. In turboprop and turboshaft engines, a low pressure compressor rotor may also be connected to the low pressure or power shaft, and the propeller or output shaft is driven by the low pressure shaft either directly or through a fixed ratio gearbox.

Because power demands on the engine vary, for example between take-off and cruise conditions, the turbine and compressor rotors of the core section typically have to rotate at a relatively large range of rotational speeds in order for the low pressure turbine rotor(s), and thus the low pressure compressor rotor(s) to have the required rotational speed. Low power requirement conditions may require the rotors of the core section to rotate relatively far below their optimal rotational speed, which may limit the engine's efficiency in such conditions.

SUMMARY

In one aspect, there is provided a gas turbine engine comprising: at least one turbine rotor drivingly engaged to an engine spool; a transmission having a first rotatable member coupled to the spool, a second rotatable member, and coupled rotatable members defining at least first and second alternate transmission paths between the first and second members, each transmission path defining a different fixed transmission ratio of a rotational speed of the second member on a rotational speed of the first member; an actuation mechanism having at least first and second positions, the actuation mechanism in each position drivingly engaging the first and second members to the coupled members of a single respective one of the transmission paths; and at least one compressor rotor coupled to the second member.

In another aspect, there is provided a gas turbine engine comprising: a low pressure turbine located downstream of and in fluid communication with an exhaust of a high pressure section of the engine, the low pressure turbine having at least one turbine rotor; a transmission having a first rotatable member, a second rotatable member, and coupled rotatable members defining at least first and second alternate transmission paths, each transmission path defining a different fixed transmission ratio of a rotational speed of the second member on a rotational speed of the first member; means for selecting any single one of the transmission paths, the means drivingly engaging the first and second members through the single one of the transmission paths; a low pressure shaft drivingly interconnecting each turbine rotor to the first member; and a low pressure compressor located upstream of and having an exhaust in fluid communication with the high pressure section of the engine, the low pressure compressor having at least one compressor rotor drivingly interconnected to the second member.

In a further aspect, there is provided a method of adjusting a rotational speed of a compressor rotor of a gas turbine engine, the method comprising: keeping a rotational speed of interconnected compressor and turbine rotors of a high pressure section of the engine at a constant value; rotating at least one rotor of a low pressure turbine with a flow of exhaust gases from the high pressure section; driving a rotation of the compressor rotor with a power shaft driven by the at least one rotor of the low pressure turbine through a transmission defining a plurality of alternate discrete transmission ratios between rotational speeds of the compressor rotor and the power shaft; and adjusting the transmission to a selected one of the transmission ratios.

DESCRIPTION OF THE DRAWINGS

Reference is now made to the accompanying figures in which:

FIG. 4 is a schematic cross sectional view of another exemplary gas turbine engine such as that shown in FIG. 1.

DETAILED DESCRIPTION

Figure 1:
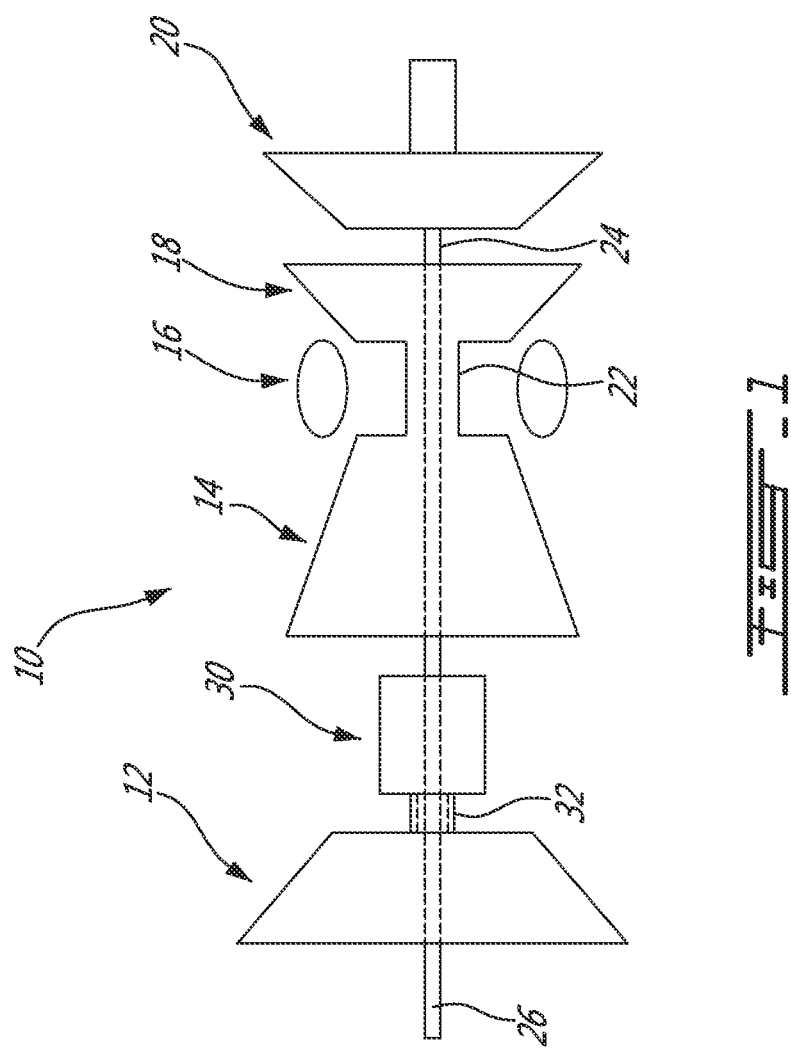
FIG. 1 is a schematic cross-sectional view of a gas turbine engine having a transmission in accordance with a particular embodiment.

FIG. 1 schematically illustrates a gas turbine engine 10, generally comprising in serial flow communication a low pressure compressor section 12 and a high pressure compressor section 14 for pressurizing the air, a combustor 16 in which the compressed air is mixed with fuel and ignited for generating an annular stream of hot combustion gases, a high pressure turbine section 18 for extracting energy from the combustion gases and driving the high pressure compressor section 14, and a low pressure turbine section 20 for further extracting energy from the combustion gases and driving at least the low pressure compressor section 12.

The engine 10 includes a high pressure shaft or spool 22 interconnecting the rotors of the high pressure turbine and compressor sections 18, 14, and a low pressure or power shaft or spool 24 allowing the rotor(s) of the low pressure turbine section 20 to drive the rotor(s) of the compressor sections 12, as will be further detailed below. In a particular embodiment, the high pressure shaft 22 is hollow and the low pressure shaft 24 extends therethrough. The two shafts 22, 24 are free to rotate independently from one another. The engine 10 further includes a variable transmission 30 driven by the low pressure shaft 24 and driving a rotatable transmission shaft 32. The transmission 30 defines a plurality of discrete transmission ratios between the rotational speeds of the low pressure shaft 24 and the transmission shaft 32.

Figure 2:
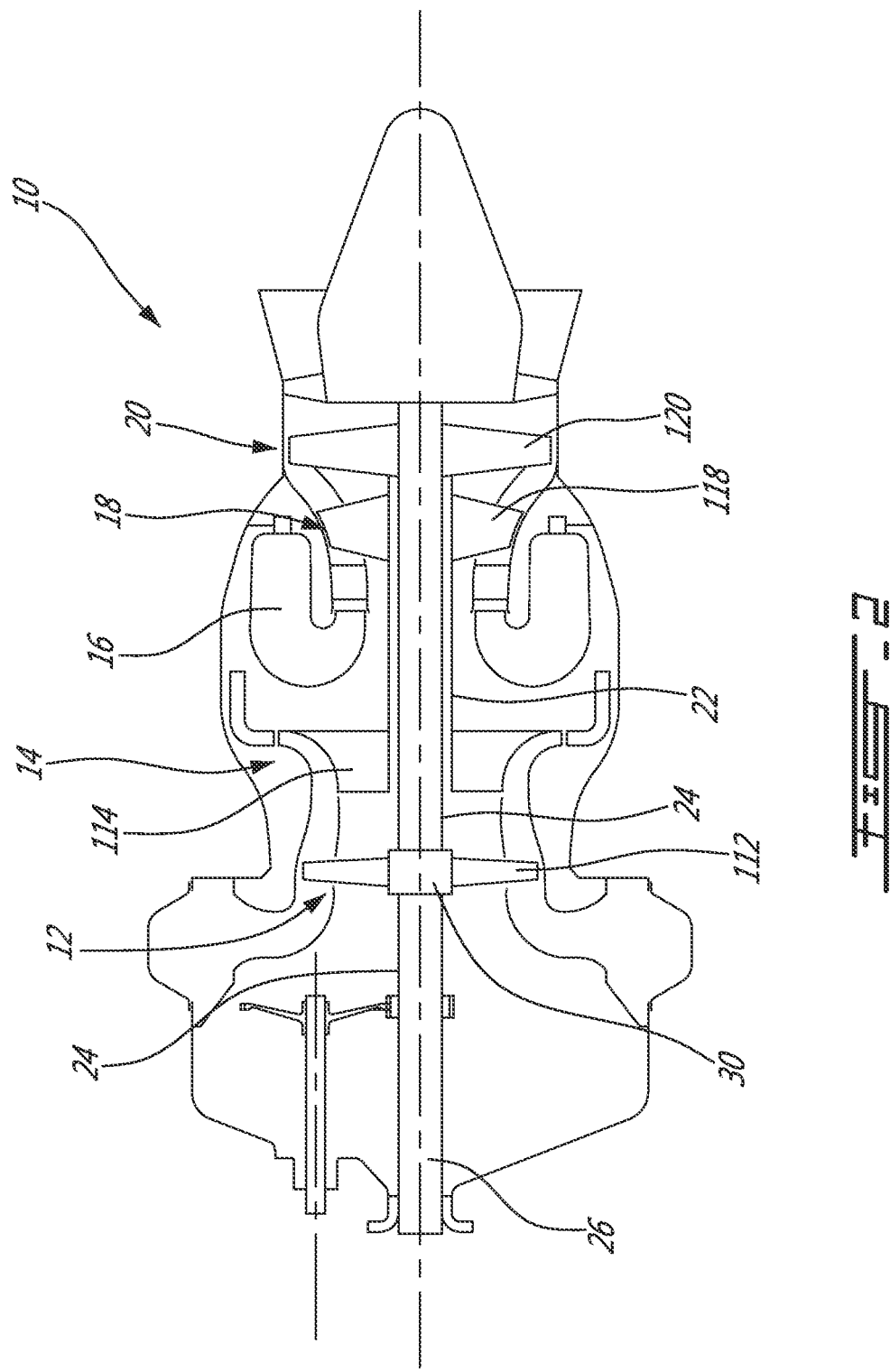
FIG. 2 is a schematic cross sectional view of an exemplary gas turbine engine such as that shown in FIG. 1.

The engine 10 schematically illustrated in FIG. 1 can be any type of gas turbine engine. In a particular embodiment shown in FIG. 2, the gas turbine engine 10 is a turboshaft engine. The high pressure compressor section 14 includes at least one high pressure compressor rotor 114 drivingly engaged to the high pressure shaft 22. The high pressure turbine section 18 includes at least one turbine rotor 118 also drivingly engaged to the high pressure shaft 22. The high pressure compressor and turbine rotors 114, 118 are directly engaged to the high pressure shaft 22, so that they rotate at a same speed.

The low pressure turbine 20 includes at least one low pressure turbine rotor 120 directly drivingly engaged to the low pressure shaft 24 so as to rotate at the same speed. The engine 10 further includes an output shaft 26, which in a particular embodiment is an extension of the low pressure shaft 24 extending through the transmission 30, such that the transmission shaft 32 is hollow (see FIG. 3) and extends around the low pressure shaft and output shaft 26. In other words, in this particular embodiment, the output shaft 26 of the engine 10 is an integral section of the low pressure shaft 24 and not affected by the transmission 30.

The low pressure compressor 12 includes at least one low pressure compressor rotor 112 connected to the transmission shaft 32 to be drivingly engaged to the low pressure shaft 24 through the variable transmission 30. The transmission 30 allows for a variation of the rotational speed of the low pressure compressor rotor(s) 112 while keeping the rotational speed of the turbine sections 18, 20 substantially constant. For example, the ratio of the transmission 30 may be adjusted such as to have a lower low pressure ratio and flow at lower power demands (e.g. cruise) and an increased low pressure ratio and flow at higher power demands (e.g. take-off).

Figure 3:
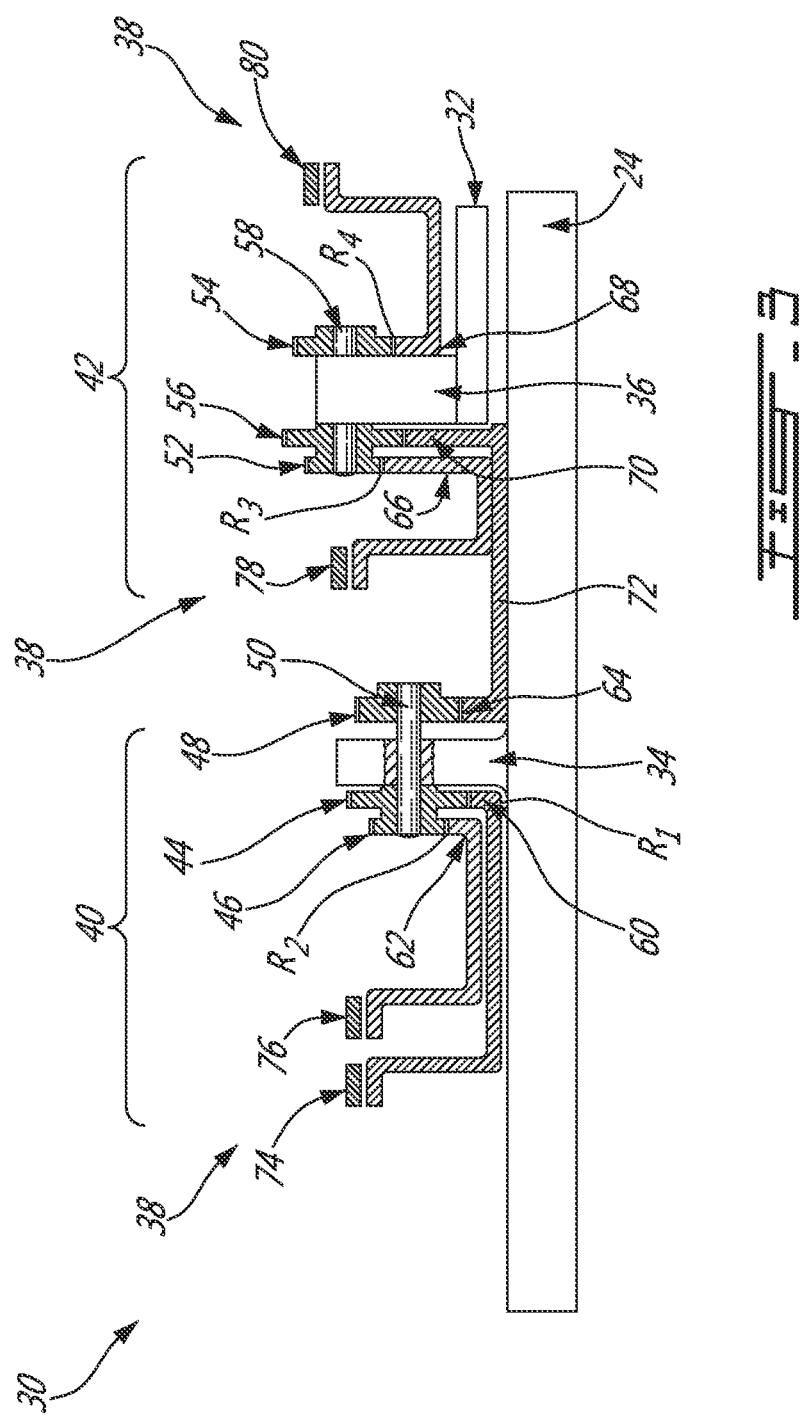
FIG. 3 is a schematic cross sectional view of a transmission of the gas turbine engine of FIG. 2.

Referring to FIG. 3, in a particular embodiment, the transmission 30 includes a first rotatable member 34 connected to the low pressure or power shaft 24, a second rotatable member 36 connected to the transmission shaft 32, and coupled rotatable members defining at least two alternate transmission paths between the first and second members 34, 36. In the embodiment shown, the coupled members defined four (4) alternate transmission paths; different numbers of alternate transmission paths are also possible. Each transmission path defines a different fixed transmission ratio of the rotational speed of the second member 36 on the rotational speed of the first member 34. Means for selecting one of the transmission ratios are provided in the embodiment shown by an actuation mechanism 38 having a different position corresponding to the actuation of each transmission path, to drivingly engage the first and second members 34, 36 through a single selected one of the transmission paths.

In the embodiment shown, the transmission 30 includes two planetary-type gear systems 40, 42, configured as planetary gear systems where the ring gears are omitted. The first and second members 34, 36 are defined by the carrier of the first and second gear systems 40, 42, respectively. The first carrier 34 supports three sets of planet gears: first and second selection sets 44, 46 and a transfer set 48, with each planet gear from each set having a common shaft 50 with a respective planet gear of each other set, such as to rotate together therewith. The second carrier 36 also supports three sets of planet gears: first and second selection sets 52, 54 and a transfer set 56, with each planet gear from each set having a common shaft 58 with a respective planet gear of each other set, such as to rotate together therewith. Each set of planet gears 44, 46, 48, 52, 54, 56 is coupled to a respective sun gear 60, 62, 64, 66, 68, 70, all shown here as being hollow and received around the low pressure shaft 24. The transfer sun gears 64, 70 coupled to the transfer sets of planet gears 48, 56 are interconnected, for example by being integrally formed on a same shaft 72. Each selection set of planet gears 44, 46, 52, 54 defines with its respective selection sun gear 60, 62, 66, 68 a gear ratio $R_1$, $R_2$, $R_3$, $R_4$. The two gear ratios of a same one of the gear systems 40, 42 ($R_1$ and $R_2$, $R_3$ and $R_4$) are different from one another; in a particular embodiment, all four gear ratios $R_1$, $R_2$, $R_3$, $R_4$ are different from one another.

In the embodiment shown, the actuation mechanism 38 includes a first brake 74, 78 and a second brake 76, 80 in each gear system 40, 42, each brake 74, 76, 78, 80 being selectively engageable to the respective selection sun gear 60, 62, 66, 68.

The selection sun gears rotate freely when not engaged to the respective brake and have a fixed position when engaged to the respective brake.

In the embodiment shown, four (4) alternate transmission paths are defined, and the actuation mechanism 38 thus has four (4) alternate positions.

In a first position of the actuation mechanism 38 defining a first transmission path, the first brake 74, 78 of each system 40, 42 is engaged to its respective selection sun gear 60, 66, thus preventing its rotation. The second brakes 76, 80 are disengaged, leaving their selection sun gears 62, 68 free to rotate and as such not part of the transmission path and not influencing the output speed of the transmission 30. The first carrier 34 rotates the first selection planet gears 44 around the fixed selection sun gear 60 of the first gear system 40. The transfer planet gears 48 of the first gear system 40 rotate about their central axis together with the first selection planet gears 44 located on the same shaft 50 and around the fixed selection sun gear 60 with the first carrier 34. The transfer planet gears 56 of the second gear system 42 are driven by the transfer planet gears 48 of the first gear system 40 through the connected transfer sun gears 64, 70. The first selection planet gears 52 of the second gear system 42 rotate together about their central axis with the transfer planet gears 56 located on the same shaft 58, and around the fixed selection sun gear 66 of the second gear system 42, causing the second carrier 36 to rotate around this fixed selection sun gear 66. The transmission ratio is thus determined by the product of the effective gear ratios of each gear system, $R_1 \cdot R_3$.

In a second position of the actuation mechanism 38 defining a second transmission path, the second brake 76, 80 of each system is engaged to its respective selection sun gear 62, 68, thus preventing its rotation. The first brakes 74, 78 are disengaged, leaving their selection sun gears 60, 66 free to rotate and as such not part of the transmission path and not influencing the output speed of the transmission. The first carrier 34 rotates the second selection planet gears 46 around the fixed selection sun gear 62 of the first gear system 40. The transfer planet gears 48 of the first gear system 40 rotate about their central axis together with the second selection planet gears 46 located on the same shaft 50 and around the fixed selection sun gear 62 with the first carrier 34. The transfer planet gears 56 of the second gear system 42 are driven by the transfer planet gears 48 of the first gear system 40 through the connected transfer sun gears 64, 70. The second selection planet gears 54 of the second gear system 42 rotate together about their central axis with the transfer planet gears 56 located on the same shaft 58, and around the fixed selection sun gear 68 of the second gear system 42, causing the second carrier 36 to rotate around this fixed selection sun gear 68. The transmission ratio is thus determined by the product of the effective gear ratios of each gear system, $R_2 \cdot R_4$.

The first and second transmission paths thus share common members: the transfer planet gears 48, 56 and the transfer sun gears 64, 70 on the shaft 72. A third transmission path can thus be defined through the portion of the first transmission path upstream of the common members, the common members and the portion of the second transmission path downstream of the common members. In a third position of the actuation mechanism 38, the first brake 74 of the first gear system 40 and the second brake 80 of the second gear system 42 are engaged to their respective selection sun gear 60, 68, thus preventing their rotation. The other brakes 76, 78 are disengaged, leaving their selection sun gears 62, 66 free to rotate and as such not part of the transmission path and not influencing the output speed of the transmission. The transmission ratio in is thus $R_1 \cdot R_4$.

Similarly, a fourth transmission path can be defined through the portion of the second transmission path upstream of the common members, the common members and the portion of the first transmission path downstream of the common members. In a fourth position of the actuation mechanism 38, the second brake 76 of the first gear system 40 and the first brake 78 of the second gear system 42 are engaged to their respective selection sun gear 62, 66, thus preventing their rotation. The other brakes 74, 80 are disengaged, leaving their selection sun gears 60, 68 free to rotate and as such not part of the transmission path and not influencing the output speed of the transmission. The transmission ratio is thus $R_2 \cdot R_3$.

In a particular embodiment, the gear ratios $R_1$, $R_2$, $R_3$, $R_4$ are selected such that the resulting transmission ratios of the rotational speed of the second carrier 36 on the rotational speed of the first carrier 34 is at least 0.6 or 60%. In a particular embodiment, the gear ratios $R_1$, $R_2$, $R_3$, $R_4$ are selected such that one or more of the resulting transmission ratios is at least 1 or 100% (allowing the low pressure compressor rotor(s) 112 to rotate at the same speed or faster than the low pressure shaft 24) while one or more of the resulting transmission ratios are below 1 or 100% (allowing the low pressure compressor rotor(s) 112 to rotate slower than the low pressure shaft 24). In a particular embodiments, the gear ratios progressively increase from $R_1$ to $R_4$, with $R_1$ and $R_2$ being smaller than 1 and $R_3$ and $R_4$ being larger than 1. Other values are also possible.

The transmission 30 may thus allow the rotational speed of the low pressure compressor rotor(s) 112 to be varied in a relatively wide range while keeping the rotational speed of the low pressure shaft 24 within a relatively small range, by selecting the proper transmission ratio to obtain the desired rotational speed of the low pressure compressor rotor(s) 112.

The illustrated embodiment thus provides for four (4) discrete transmission ratios between the low pressure shaft 24 and the transmission shaft 32 driving the low pressure compressor rotor(s) 112. Fewer or more transmission ratios can be provided, by removing or adding assemblies of a brake, a selection sun gears and a selection set of planet gears on the first and/or the second gear system, by adding one or more gear systems, etc. For example, a transmission with two (2) discrete transmission ratios may be provided with three (3) planetary gear sets. The transmission 30 defines transmission paths which are parallel, allowing the actuation mechanism 38 to change the transmission ratio without the need for a clutch.

Advantageously, the transmission 30 driving the low pressure compressor rotor(s) 112 may help optimize the performances and surge margin of the low pressure compressor 12, by scheduling the speed of the low pressure compressor rotor(s) 112 as a function of the aerodynamic speed of the high pressure compressor rotor(s) 114. The use of the transmission 30 may also allow for the power output of the engine 10 to be varied while maintaining core temperature and rotational speeds where the turbine sections 18, 20 are most efficient. The transmission 30 may allow for the low pressure compressor 12 to operate at a more optimum speed relative to the power demand, thus increasing its efficiency even when keeping the turbine sections 18, 20 at constant or relatively constant speeds. Accordingly, it may also allow for the high pressure section to be maintained at a more constant speed throughout the range of power demands. In a particular embodiment, the transmission 30 allows for the rotational speed of the high pressure turbine section 18 to be kept within a range of approximately from 80 to 100% of its optimal speed, by contrast with an equivalent engine having the low pressure compressor directly driven by the low pressure shaft which typically has the high pressure turbine section rotating within a range of 50 to 100% of its optimal speed.

Although the transmission 30 has been described here as being applied to driving the low pressure compressor rotor(s) 112 in a turboshaft engine, other applications are also possible. The transmission 30 can be used to drive the rotor(s) of low pressure compressors 12 in other types of gas turbine engines, for example turbofans (FIG. 4) and turboprops. Also, the engine output shaft 26 of FIGS. 1-2 may be an integral part of or connected to the transmission shaft 32 such that the transmission 30 affects the rotational speed of the engine output shaft 26. Similarly, for a turbofan, the transmission shaft 32 may be keyed to the fan such that the transmission 30 affects the rotational speed of the fan. The transmission 30 may also be used to drive a propeller in a turboprop engine. The transmission 30 may also be used in any type of gas turbine engine, including industrial power plants and auxiliary power units, for example to drive low pressure compressor rotor(s).

Accordingly, the above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A gas turbine engine comprising:
   at least one turbine rotor drivingly engaged to an engine spool;
   a transmission having a rotatable first member coupled to the spool, a rotatable second member, and rotatable coupled members defining at least first and second alternate transmission paths between the first and second members, each transmission path being defined by the coupled members of the respective one of the transmission paths and defining a different fixed transmission ratio of a rotational speed of the second member on a rotational speed of the first member;
   an actuation mechanism having at least first and second positions, the actuation mechanism in each position drivingly engaging the first and second members to the coupled members of a single respective one of the transmission paths, the actuation mechanism in each position including at least one brake removably engaged with and preventing rotation of one of the coupled members of the respective one of the transmission paths; and
   at least one compressor rotor coupled to the second member.

2. The gas turbine engine as defined in claim 1, wherein the second member is also coupled to one element selected from the group consisting of a fan, a propeller, and an output shaft of the engine.

3. The gas turbine engine as defined in claim 1, wherein the coupled members include at least one common member between the first and second transmission paths, at least one respective upstream member for each of the first and second transmission paths upstream of the at least one common member and at least one respective downstream member for each of the first and second transmission paths downstream of the at least one common member, the coupled members defining a third alternate transmission path with the at least one respective upstream member of the first transmission path, the at least one common member and the at least one respective downstream member of the second transmission path, and a fourth transmission path with the at least one respective upstream member of the second transmission path, the at least one common member and the at least one respective downstream member of the first transmission path, the actuation mechanism further having third and fourth positions respectively corresponding to the third and fourth transmission paths.

4. The gas turbine engine as defined in claim 1, wherein the first member is a first carrier and the second member is a second carrier, the coupled members including at least first, second and third sets of planetary gears supported by one of the first and second carriers and fourth and fifth sets of planetary gears supported by the other of the first and second carrier, the third and fourth sets of planetary gears being drivingly engaged to one another through at least one of the coupled members, the coupled members further including a respective sun gear coupled to each one of the first, second and fifth sets of planetary gears, the actuation mechanism in the first position preventing rotation of the sun gears coupled to first and fifth sets of planetary gears while allowing the sun gear coupled to the second set of planetary gears to rotate freely, and in the second position preventing rotation of the sun gears coupled to second and fifth sets of planetary gears while allowing the sun gear coupled to the first set of planetary gears to rotate freely.

5. The gas turbine engine as defined in claim 4, wherein the third and fourth sets of planetary gears are each coupled to a respective one of two interconnected sun gears.

6. The gas turbine engine as defined in claim 4, wherein the coupled members further includes a sixth set of planetary gears supported by the other of the first and second carriers and the coupled members further include a sun gear coupled to the sixth set of planetary gears, the actuation mechanism in the first and second positions allowing the sun gear coupled to the sixth set of planetary gears to rotate freely, in a third position preventing rotation of the sun gears coupled to first and sixth sets of planetary gears while allowing the sun gear coupled to the second and fifth sets of planetary gears to rotate freely, and in a fourth position preventing rotation of the sun gears coupled to second and sixth sets of planetary gears while allowing the sun gear coupled to the first and fifth sets of planetary gears to rotate freely.

7. The gas turbine engine as defined in claim 4, wherein the at least one brake of the actuation mechanism includes a respective brake selectively engageable with the sun gear coupled to each one of the first, second and fifth sets of planetary gears.

8. The gas turbine engine as defined in claim 6, wherein the at least one brake of the actuation mechanism includes a respective brake selectively engageable with the sun gear coupled to each one of the first, second, fifth and sixth sets of planetary gears.

9. The gas turbine engine as defined in claim 1, wherein the transmission ratios of the rotational speed of the second member on the rotational speed of the first member include at least one ratio having a value of at least 1 and at least one ratio having a value lower than 1.

10. A gas turbine engine comprising:
a low pressure turbine located downstream of and in fluid communication with an exhaust of a high pressure section of the engine, the low pressure turbine having at least one turbine rotor;
a transmission having a rotatable first member, a rotatable second member, and rotatable coupled members defining at least first, second, third and fourth alternate transmission paths, each transmission path defining a different fixed transmission ratio of a rotational speed of the second member on a rotational speed of the first member;
an actuation mechanism having at least first, second, third and fourth positions, the actuation mechanism in each position drivingly engaging the first and second members through a single respective one of the transmission paths;
a low pressure shaft drivingly interconnecting each turbine rotor to the first member; and
a low pressure compressor located upstream of and having an exhaust in fluid communication with the high pressure section of the engine, the low pressure compressor having at least one compressor rotor drivingly interconnected to the second member.

11. The gas turbine engine as defined in claim 10, wherein each transmission path is defined by the coupled members of the respective one of the transmission paths and the actuation mechanism includes at least one brake removably engagable with a corresponding one of the coupled members in each one of the transmission paths.

12. The gas turbine engine as defined in claim 10, wherein the first member is a first carrier and the second member is a second carrier, the coupled members including at least first, second and third sets of planetary gears supported by one of the first and second carriers and fourth and fifth sets of planetary gears supported by the other of the first and second carrier, the third and fourth sets of planetary gears being drivingly engaged to one another through at least one of the coupled members, the coupled members further including a respective sun gear coupled to each one of the first, second and fifth sets of planetary gears, the actuation mechanism preventing rotation of the sun gears coupled to first and fifth sets of planetary gears while allowing the sun gear coupled to the second set of planetary gears to rotate freely for the first transmission path, and preventing rotation of the sun gears coupled to second and fifth sets of planetary gears while allowing the sun gear coupled to the first set of planetary gears to rotate freely for the second transmission path.

13. The gas turbine engine as defined in claim 12, wherein the third and fourth sets of planetary gears are each coupled to a respective one of two interconnected sun gears.

14. The gas turbine engine as defined in claim 12, wherein the coupled members further includes a sixth set of planetary gears supported by the other of the first and second carriers and the coupled members further include a sun gear coupled to the sixth set of planetary gears, the actuation mechanism allowing the sun gear coupled to the sixth set of planetary gears to rotate freely for the first and second transmission paths, preventing rotation of the sun gears coupled to first and sixth sets of planetary gears while allowing the sun gear coupled to the second and fifth sets of planetary gears to rotate freely for a third transmission path, and preventing rotation of the sun gears coupled to second and sixth sets of planetary gears while allowing the sun gear coupled to the first and fifth sets of planetary gears to rotate freely for a fourth transmission path.

15. The gas turbine engine as defined in claim 10, wherein the transmission ratios of the rotational speed of the second member on the rotational speed of the first member include at least one ratio having a value of at least 1 and at least one ratio having a value lower than 1.

16. A method of adjusting a rotational speed of a compressor rotor of a gas turbine engine, the method comprising:
keeping a rotational speed of interconnected compressor and turbine rotors of a high pressure section of the engine at a constant value;

rotating at least one rotor of a low pressure turbine with a flow of exhaust gases from the high pressure section;

driving a rotation of the compressor rotor with a power shaft driven by the at least one rotor of the low pressure turbine through a transmission having a plurality of transmission paths defining a plurality of alternate discrete transmission ratios between rotational speeds of the compressor rotor and the power shaft; and adjusting the transmission to a selected one of the transmission ratios, including actuating a selected one of the plurality of transmission paths by preventing a rotation of at least one rotatable member in the selected one of the transmission paths and allowing a free rotation of at least one rotatable member in each one but the selected one of the plurality of transmission paths.

17. The method as defined in claim 16, further including driving a rotation of one element selected from the group consisting of a fan, a propeller, and an output shaft of the engine through the transmission.

* * * * *